United States Patent [19]

Federspiel

[11] 4,241,815
[45] Dec. 30, 1980

[54] VARIABLE-THROTTLE VALVE

[75] Inventor: Jean Federspiel, Paris, France

[73] Assignee: Commissariat a l'Energie Atomique, Paris, France

[21] Appl. No.: 110,598

[22] Filed: Jan. 9, 1980

Related U.S. Application Data

[60] Division of Ser. No. 974,608, Dec. 29, 1978, abandoned, which is a continuation of Ser. No. 728,120, Sep. 30, 1976, abandoned.

[30] Foreign Application Priority Data

Oct. 9, 1975 [FR] France .................................. 75 30944

[51] Int. Cl.³ ............................................... F16F 9/34
[52] U.S. Cl. ..................................... 188/282; 137/493; 188/317
[58] Field of Search ................ 188/280, 281, 282, 317, 188/322; 137/493, 493.3

[56] References Cited

U.S. PATENT DOCUMENTS

| 2,087,451 | 7/1937 | Rossman et al. | 188/317 |
| 2,521,202 | 9/1950 | Cloudsley | 188/282 |
| 3,747,714 | 7/1973 | DeCarbon | 188/317 |

FOREIGN PATENT DOCUMENTS

| 717867 | 9/1965 | Canada | 188/282 |
| 838403 | 5/1952 | Fed. Rep. of Germany | 188/280 |
| 2426326 | 12/1974 | Fed. Rep. of Germany | 188/280 |
| 2194267 | 2/1974 | France | |
| 485685 | 10/1953 | Italy | 188/317 |
| 1351916 | 5/1974 | United Kingdom | 137/493 |
| 1539447 | 1/1979 | United Kingdom | 188/282 |

Primary Examiner—Edward R. Kazenske
Attorney, Agent, or Firm—Pearne, Gordon, Sessions, McCoy & Granger

[57] ABSTRACT

The valve is mounted within the piston of a hydraulic shock-absorber for a vehicle suspension system. An axial rod attached to the piston is surrounded by a passageway and fitted with a moving element consisting of an elastically deformable washer which moves between two end positions defined by stops. In one end position, the cross-sectional area permits free flow of the operating fluid between the wall of the passageway and the washer. In the other end position, the passageway is throttled and the flow is limited in respect of a fluid pressure below a predetermined threshold value. In the throttling position the washer is capable of undergoing elastic deformation in respect of a fluid pressure above the threshold value in order to increase the flow cross-section.

4 Claims, 28 Drawing Figures

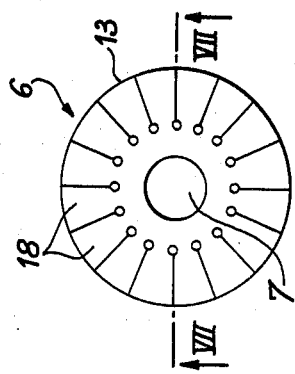
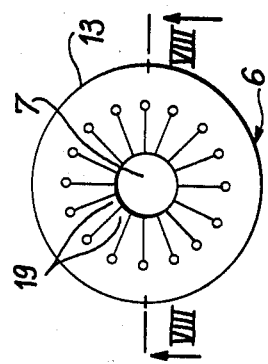
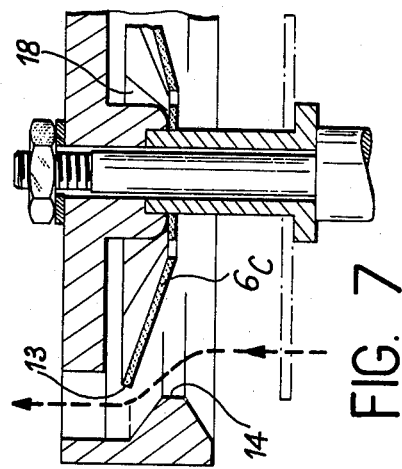
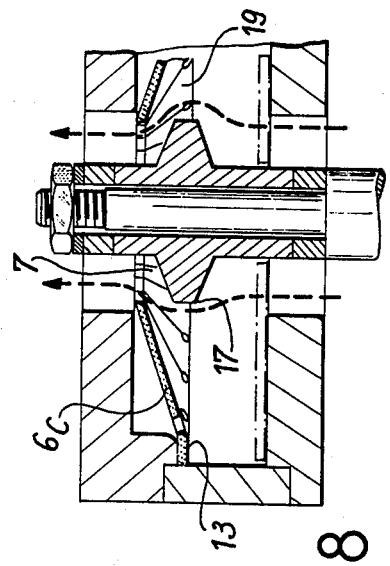
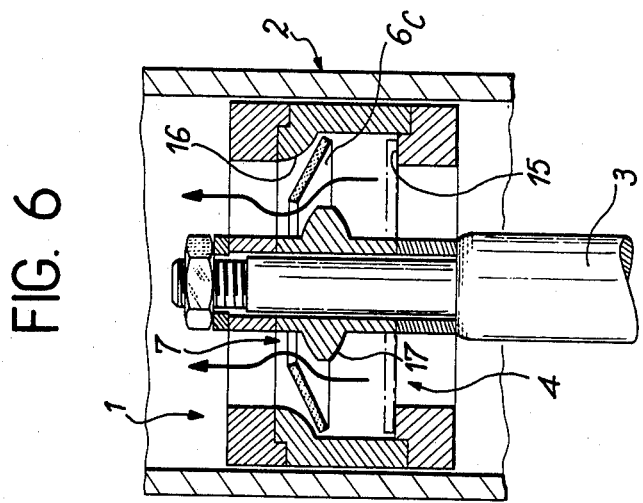

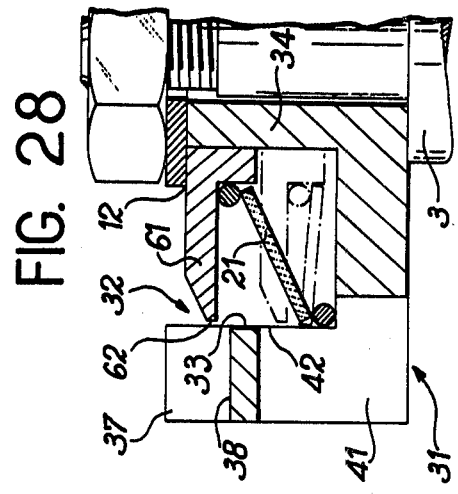
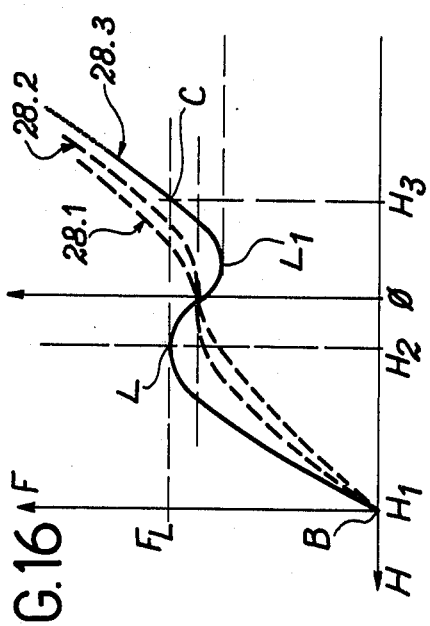
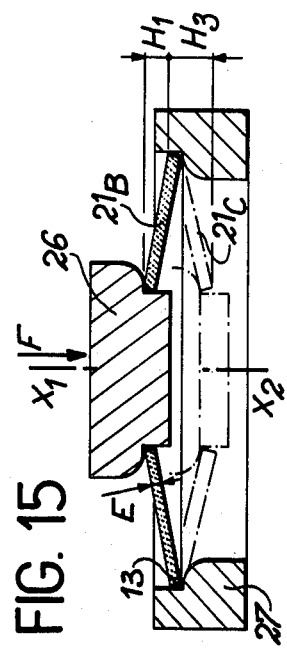
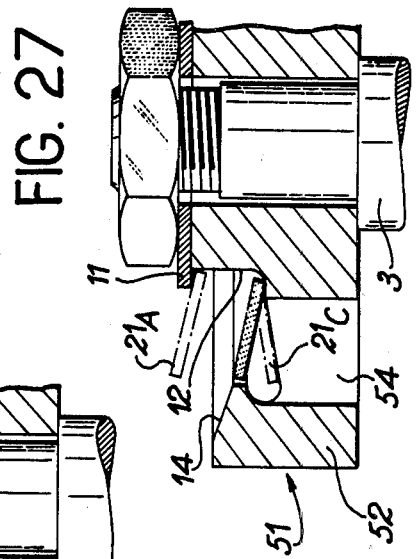

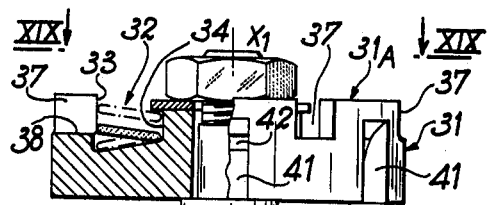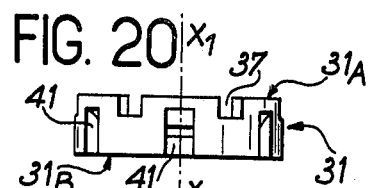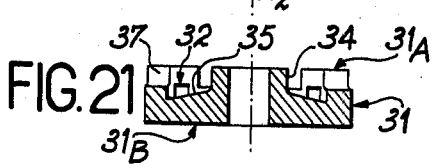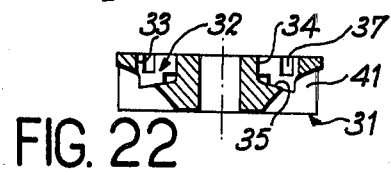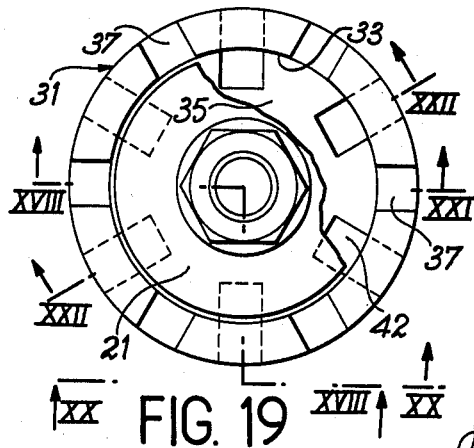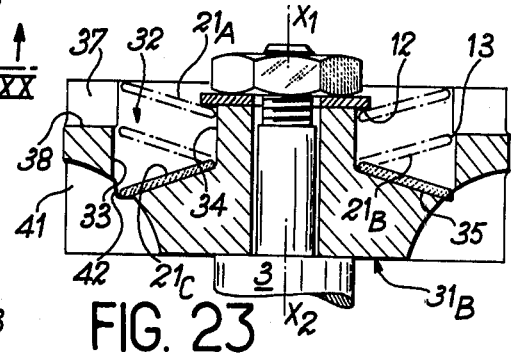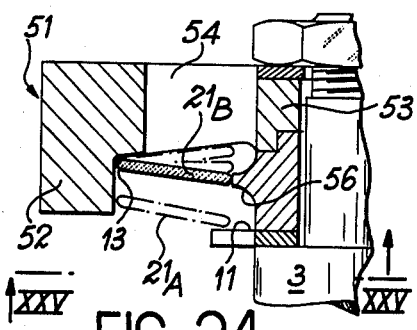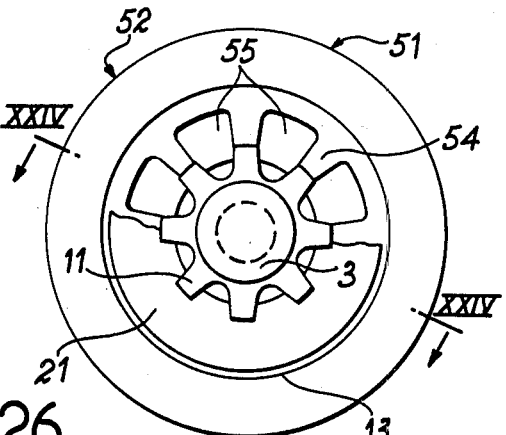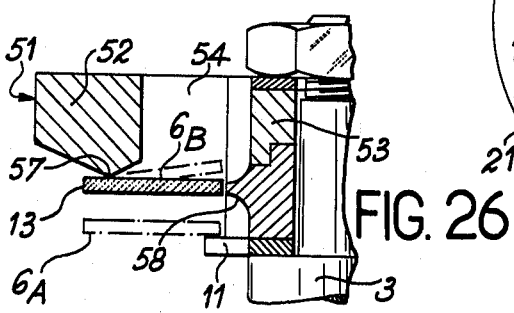

VARIABLE-THROTTLE VALVE

This is a division of Ser. No. 974,608, filed Dec. 29, 1978 (now abandoned), which was a continuation of application Ser. No. 728,120 filed Sept. 30, 1976 (now abandoned).

This invention relates to a variable-throttle valve, especially for the ported piston of a hydraulic shock-absorber for a vehicle suspension system, said valve being intended to control the flow through the piston of a damping fluid contained in a cylinder which is rigidly fixed to a portion of the vehicle, said ported piston being rigidly fixed to an axial rod which is attached to another portion of the vehicle and being capable of sliding within the cylinder in order to damp the relative movements of displacement of the two portions.

There are many known designs of valves of the type mentioned above in which provision is made in particular for a flexible moving element mounted transversely within a passageway formed in the piston and having a central opening fitted over the axial rod of the piston. When the piston is subjected to a movement within the cylinder under the action of the flow of fluid within the passageway of said piston, the moving element is capable of axial displacement between two end positions defined by stops which are rigidly fixed to the piston. In a first end position or so-called free-flow position, one edge of the moving element is held at a distance from a surface of revolution of the passageway so as to permit free flow of the fluid in one direction.

In the other end position of the moving element or so-called throttling position, a limited flow of the fluid in the opposite direction is usually permitted by means of a calibrated orifice which is left free by the moving element. An arrangement of this type which is contemplated for example in French Pat. No. 1,244,909 is nevertheless subject to a disadvantage, especially for the suspension of a vehicle, by reason of the fact that the cross-sectional area for the flow of liquid in the throttling position of the moving element is independent of the pressure of the liquid.

The inventor has in fact found that, especially in the case of suspension shock-absorbers of the so-called sequential type in accordance with French Pat. No. 2,194,267, the comfort of the suspension system could be enhanced by designing a valve such that the cross-sectional area provided for the flow of fluid in the throttling position of the moving element is substantially zero up to a predetermined threshold value of fluid pressure but can increase above this threshold value of pressure. In other words, the valve to be obtained must be so designed as to cause the liquid to flow in the desired direction at a predetermined pressure without overstepping this pressure to an excessive degree. The corresponding direction is preferably that of expansion of the shock-absorber when this latter is designed in accordance with the patent cited above. In the opposite direction, the valve must on the contrary ensure free flow of the liquid in order to produce the desired suspension effect while permitting rapid compression of the shock-absorber.

This invention is precisely directed to a valve which satisfies the operating conditions mentioned in the foregoing and takes into account considerations of overall size, low cost price and endurance since these requirements must be met in the case of a suspension shock-absorber which is intended to be manufactured in large-scale production.

The valve in accordance with the invention comprises on the one hand a body of revolution rigidly fixed to an axial rod and provided with a passageway for a fluid, said passageway being of revolution with respect to the axis of said valve body and on the other hand a moving element which is capable of displacement with respect to said body, said moving element which is mounted transversely within said passageway and pierced by a central opening fitted over said rod being such as to have a central edge and a peripheral edge and being capable of displacement under the action of the flow of fluid along the axis of revolution of said valve body, said valve body being provided with first means which serve to limit the displacement of said moving element in respect of a first direction of flow of said fluid and which define a first end position of said moving element or so-called free-flow position and with second means which serve to limit the displacement of said moving element in respect of a second direction of flow of said fluid and which define a second end position of said moving element or so-called throttling position, said passageway being such as to define with one of the edges of said moving element on the one hand a cross-sectional area which permits the free flow of fluid when said passageway is in the free-flow position and on the other hand a constricted cross-section which limits the flow of fluid in respect of a fluid pressure below a predetermined threshold value when said moving element is in the throttling position, at least part of said moving element being capable of undergoing elastic deformation in the throttling position in respect of a fluid pressure which is higher than said threshold value in order to increase said constricted flow cross-section.

In one embodiment, said moving element is constituted by a washer which is capable of undergoing elastic deformation, the characteristics and especially the thickness of said washer as a function of the caliber of the constricted flow passage being chosen so as to produce within said flow passage a predetermined pressure for the fluid to be controlled, in the desired direction of flow. As will be explained below, this makes it possible in particular to obtain optimum operating conditions in the case of a suspension shock-absorber of the sequential type in accordance with the patent cited earlier.

In accordance with the invention, said moving element can advantageously be constituted by a conical washer, the deflection in the condition of rest and the thickness of said washer being chosen so as to permit of temporary and elastic reversal of conicity of the washer in its throttling position under the action of the pressure of the fluid. As will be explained below, this arrangement makes it possible in the operating condition corresponding to the throttling position of the washer to achieve an abrupt and well-defined threshold which is highly conducive to the desired effect, especially in the case of a suspension shock-absorber of the sequential type mentioned above.

In another embodiment of the valve in accordance with the invention in which the valve body has a suitable structure, said moving element comprises a washer which is capable of elastic deformation and an auxiliary piston rigidly fixed to said washer, said piston being such as to define with said passageway the aforesaid free-flow and constricted cross-sections, the constricted cross-section being enlarged under the action of deformation of said washer.

In any one of the aforementioned embodiments, said first and second means for defining the end positions of the moving element are preferably constituted by stops which can be designed and arranged on the valve body in various ways in order to cooperate either with the central edge of the moving element or with the peripheral edge thereof.

Further characteristic features and advantages of the invention will become apparent from the following description of a few embodiments which are given by way of example and not in any limiting sense, and in which.

Figure 1:
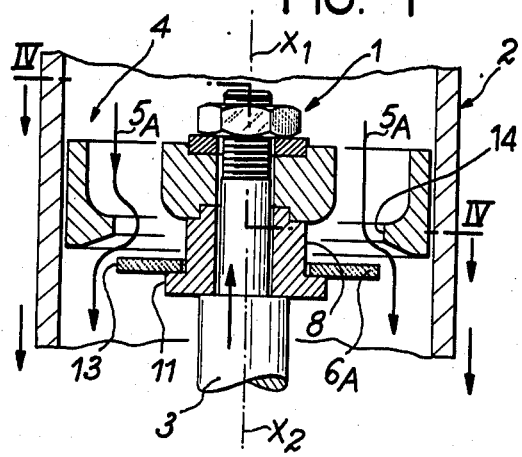
FIGS. 1, 2, 3 are diagrammatic views of a first alternative embodiment of the variable-throttle valve in accordance with the invention, in axial cross-section along the line I—I of FIG. 4, and in three main positions of the resilient washer.
Figure 4:
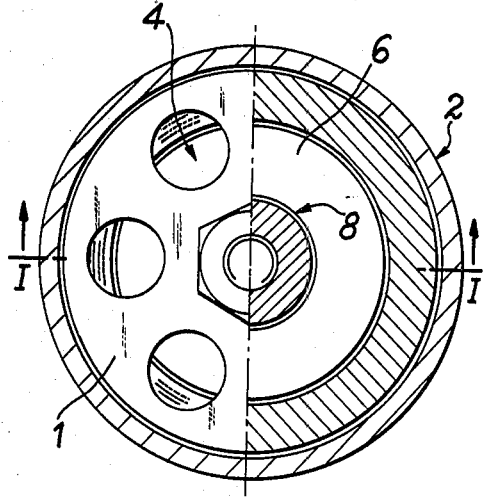
FIG. 4 is a view in plan and in transverse half-section of the valve of FIG. 1 along the line IV—IV.
Figure 2:
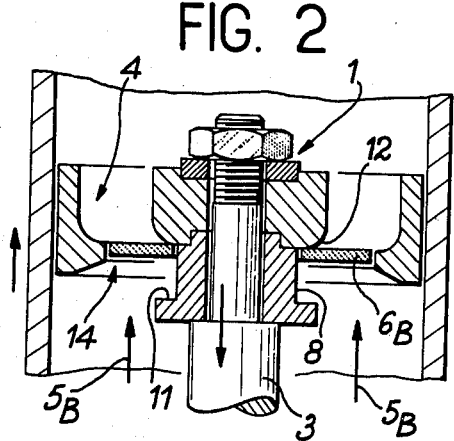
Figure 3:
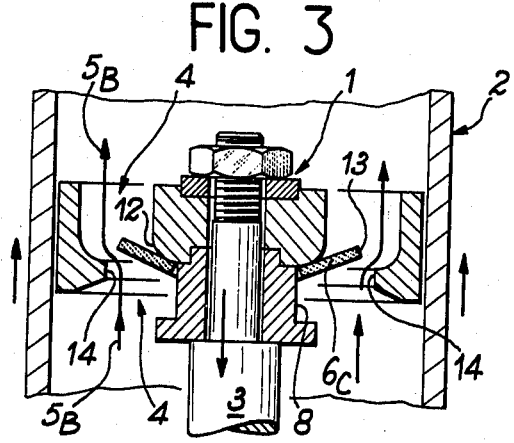
Figure 12:
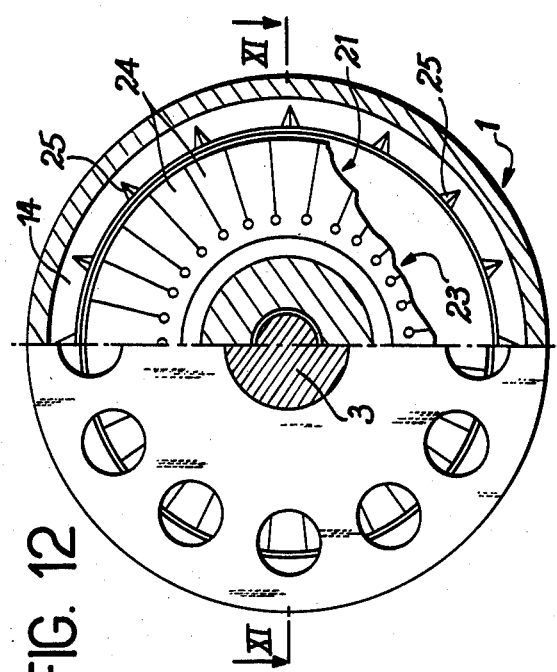
Figure 14:
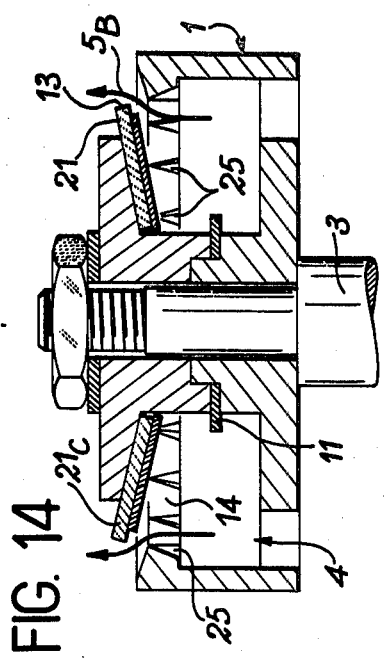
Figure 11:
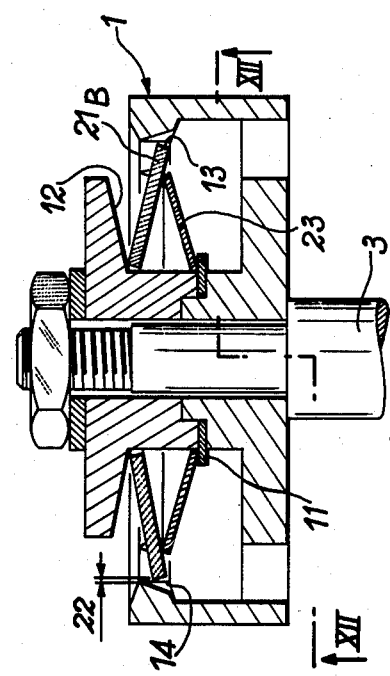
Figure 13:
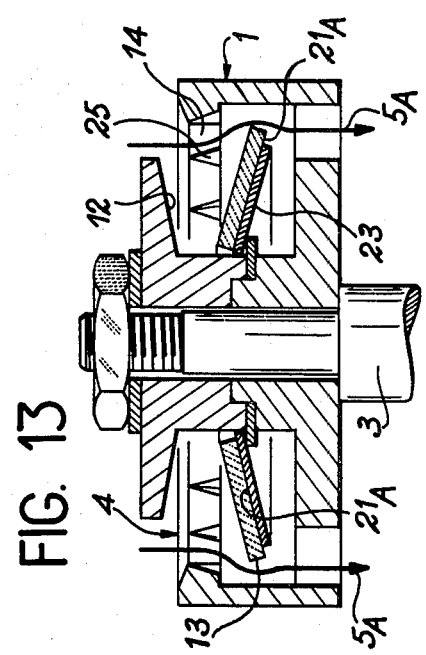

FIGS. 6 to 8 which are similar to FIG. 3 show diagrammatically three alternative embodiments of the valve in accordance with the invention in the position of throttling and of deformation of the resilient washer;

FIGS. 9 and 10 are diagrammatic plan views of two washers having radial sectors mounted respectively on the valves of FIGS. 7 and 8;

FIGS. 11, 13, 14 which are similar to FIGS. 1, 2, 3 illustrate an alternative industrial embodiment of the valve in accordance with the invention, this valve being fitted with a washer which provides resilient reversal of conicity and shown in axial cross-section along the line XI—XI of FIG. 12;

FIG. 12 which is similar to FIG. 4 is a view in plan and in transverse half-section of the valve of FIG. 11 along line XII—XII;

FIG. 15 shows diagrammatically a test assembly of the conical washer of the valve shown in FIG. 11;

FIG. 16 is a graph in which the variation in deflection of the washer of FIG. 15 is plotted as a function of the load in three main cases of the ratio of the deflection in the condition of rest to the thickness of said washer;

FIG. 17 is a diagram associated with FIG. 16 and representing the three main positions of the washer of the valve shown in FIGS. 11 to 14;

FIG. 18 shows another alternative industrial embodiment of the valve in accordance with the invention, this view being taken in elevation and in axial half-section along line XVIII—XVIII of FIG. 19;

FIG. 19 is a plan view of the valve shown in FIG. 18 along line XIX—XIX;

FIGS. 20, 21, 22 are three diagrammatic views of the piston constituting the valve body of FIGS. 18 and 19, these views being taken respectively in elevation along Line XX—XX, in axial cross-section along line XVIII—XXI and along line XXII—XXII of FIG. 19;

FIG. 23 is a schematic diagram which shows the operation of the valve of FIG. 18 and incorporates the three main positions of the resilient washer opposite to two associated castellated recesses;

FIGS. 24, 26, 27, 28 which are similar to FIG. 17 show four further alternative industrial embodiments of the valve in accordance with the invention;

FIG. 25 is a plan view of the valve of FIG. 24 along the line XXV—XXV.

Figure 5:
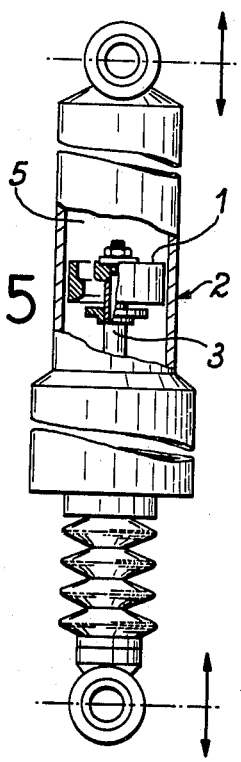
FIG. 5 is a diagram of a hydraulic shock-absorber for a suspension system in which the piston is fitted with the valve of FIGS. 1 to 4.

In the embodiment shown in FIGS. 1 to 4, the variable-throttle valve is mounted by way of example within the ported piston 1 of a hydraulic shock-absorber 2 for the suspension of a vehicle as shown diagrammatically in FIG. 5. The valve comprises a body constituted in this case by the piston 1 which is rigidly fixed to an axial rod 3 attached for example to a portion (not shown) of the vehicle whilst the cylindrical body of the shock-absorber 2 is attached to another portion of the vehicle. The piston 1 is provided with a passageway 4 which surrounds the piston-rod 3. As shown by way of example in FIG. 4, a certain number of holes pierced in the end-wall of the piston 1 are uniformly spaced about the axis X1-X2 of the rod 3 and of the piston 1 so as to form a passageway for a fluid such as a damping fluid 5 of the shock-absorber 2 (as shown in FIG. 5).

A flexible washer 6 is mounted transversely within the passageway 4 and has a central opening 7 (as shown in FIGS. 9, 10), said opening being fitted over a cylindrical boss 8 which is mounted on the piston-rod 3. The washer 6 which is thus subjected to the effect of flow of the fluid 5 as a result of the displacements of the piston 1 is capable of moving axially within the passageway 4 between two end positions 6A, 6B (shown in FIGS. 1, 2) defined by stops 11, 12 which are rigidly fixed to the rod 3. In a first end position 6A or so-called free-flow position, a peripheral edge 13 of the washer 6 is thus held at a distance from an annular projection 14 of the peripheral wall of the passageway 4 and directed towards the axis X1-X2. This free-flow position 6A of the washer permits free flow of the fluid 5 in the direction defined by the arrows 5A (as shown in FIG. 1).

In accordance with the invention, the edge 13 of the washer in the throttling position 6B of this latter defined by the stop 12 is located opposite to the annular projection 14 aforesaid (as shown in FIG. 2) and cooperates with said projection so as to counteract the flow of fluid in the opposite direction as defined by the arrows 5B. Furthermore, in the same throttling position 6B (shown in FIG. 2), the resilient washer is capable of deformation under the action of the pressure of the fluid 5 and in the direction 5B of flow of this latter so as to permit a displacement of the active edge 13 of the washer beyond the annular projection 14, thus resulting in a widening of the constricted passage. The corresponding position 6C of the elastically deformed washer is shown in FIG. 3.

In the device of FIGS. 1 to 4 in which the two stops 11, 12 of the washer 6 are placed on the same side as the axial rod 3 and cooperate with the central opening of the washer, the flow of fluid can take place opposite to the peripheral edge 13, between this latter and that wall of the passageway 4 on which the annular projection 14 is formed and directed towards the axis X1-X2 at the level of the throttling position 6B of the resilient washer (as shown in FIG. 2).

In FIG. 6 which is similar to FIG. 3, there is shown an alternative design of the valve in accordance with the invention. Two stops 15, 16 which define the two end positions of the resilient washer 6 which is similar to the washer of FIGS. 1 to 4 are formed on the wall of the passageway 4. In this case, the flow of fluid can take place opposite to the edge of the central opening 7 of the washer, between said edge and a tubular member mounted on the axial rod 3 which is provided at the level of the throttling position of the washer 6 with an annular projection 17, said projection being directed towards the aforesaid wall of the passageway 4.

As shown in FIGS. 1 to 6, the washer 6 is solid, for example, and formed of special steel in order to have good characteristics of elasticity. In the case of a shock-absorber piston having a diameter of approximately 35 mm, for example, the washer 6 can have an external diameter of the order of 28 mm, an internal diameter of 14 mm and a thickness of approximately 0.8 mm.

In order to ensure a higher degree of elasticity, the washer 6 can have radial sectors 18, 19 (as shown in FIGS. 9, 10) delimited by radial cuts extending from one edge of the washer and terminating at a predetermined distance from the other edge. In the case in which the flow of fluid takes place opposite to the peripheral edge 13 (as shown in FIG. 7), it is thus possible to increase the flexibility of the washer on the same side as said edge by means of radial sectors 18 forming outwardly directed flexible tongues. There will preferably be employed radial sectors 19 (as shown in FIG. 10) which are directed towards the central opening 7 if the flow of fluid is intended to take place through said opening (as shown in FIG. 8).

FIGS. 11 to 14 show a preferred industrial embodiment of the valve in accordance with the invention in which the valve comprises a conical washer 21 without radial cuts. The thickness and deflection of the washer 21 in the condition of rest (as shown in FIGS. 13 and 15) are chosen so as to permit temporary and elastic reversal of conicity of the washer in its throttling position 21B (as shown in FIG. 11). As explained hereinafter, this reversal of conicity permits an advantageous opening of the throttled passage in the deformed position 21C of the washer (as shown in FIG. 14), said passage being enlarged for the flow of fluid under pressure in the direction of the arrows 5B.

As explained hereinafter with reference to FIGS. 15 to 17, the deflection at rest and the thickness of the washer 21 are preferably chosen in a ratio which is higher than 1.4. It is also preferably ensured that, especially in the case of a hydraulic shock-absorber piston 1 which makes use of a substantially incompressible fluid 5 (FIGS. 1 to 5), the active edge 13 of the washer 21 and the associated annular zone of the passageway 4 as constituted by the annular projection 14 are adjusted with respect to each other in a substantially leak-tight manner in the throttling position 21B of the non-deformed washer (as shown in FIG. 11). The corresponding radial clearance 22 of 0.01 mm, for example, has been exaggerated in FIG. 11 for reasons of clarity of the drawing. Similarly, the deflection of the washer 21 as shown is considerably in excess of the actual value.

There can be associated with the main resilient washer 21 (shown in FIGS. 11 to 14) a low-tension restoring spring which tends to return the main washer to the throttling position 21B. By way of example, the restoring spring can be constituted by an auxiliary resilient washer 23 having a conicity in the state of rest which is opposite to that of the main washer 21 (as shown in FIGS. 11, 12) and comprising radial sectors 24 which are directed towards the active edge 13 of the main washer 21.

The annular projection 14 is advantageously provided in that portion which is located opposite to the associated edge 13 of the washer 21 with grooves 25 having a cross-section which is variable in the axial direction and increases towards the free-flow position 21A of the washer (as shown in FIG. 13).

The operation of the valve described in the foregoing will now be explained.

In the embodiment shown diagrammatically in FIGS. 1 to 4, the valve in accordance with the invention offers a very low resistance to the flow of the fluid 5 (FIG. 5) in the direction of the arrows 5A (FIG. 1) corresponding to the free-flow position 6A of the washer which is held at a distance from the annular projection 14. On the contrary, in the opposite direction (arrows 5B - FIG. 2) corresponding to the throttling position 6B of the washer which is applied against the stop 12 under the pressure of fluid, the valve affords high resistance to the flow of the fluid. This latter is in fact located at the level of the throttling projection 14 which is associated with the peripheral edge 13 of the washer 6.

The characteristics of the passage which is thus throttled and especially the residual radial clearance between the edge 13 and the annular projection 14 as well as the flexibility of the resilient washer 6 are chosen so as to offer a predetermined resistance to the flow of the fluid 5. Especially as a function of the viscosity of this latter and as a function of the thickness and the elasticity of the washer, it is thus possible to adjust the characteristics and the reactions of the valve in accordance with the invention so as to obtain a predetermined value of pressure of the fluid 5 in the throttling position of the deformed washer 6C (as shown in FIG. 3). This corresponds to a predetermined effort exerted on the piston-rod 3. In the case of a suspension shock-absorber 2 of the type illustrated in FIG. 5 which is especially contemplated by the invention, the law of response of the shock-absorber can thus be adjusted to alternate stresses.

In the case of shock-absorbers of the sequential type in accordance with the French patent cited earlier, it is thus possible in particular to adjust the time-duration of the period of return of the shock-absorber to the position of equilibrium under the action of the elastic suspension means of the vehicle after these latter have been displaced in compression by passing over a bump or unevenness of the ground. The shock-absorber nevertheless remains ready to undergo a rapid movement of compression in respect of any impulse applied to the piston-rod 3 in the corresponding direction and practically without offering any resistance. It has been noted that the flow of liquid takes place in that case in the direction of the arrows 5A (as shown in FIG. 1), thus applying the washer 6 against the free-flow stop 11.

There is shown in FIG. 15 a test assembly for studying the reactions of the conical washer 21 of FIGS. 11 to 14 under the action of an increasing axial load "F". This load is applied by means of a shaped bearing member 26 engaged within the central opening of the washer, said washer being maintained by means of a stationary ring 27 which is adjusted to the peripheral edge 13 of said washer. The reference "E" designates the thickness of the washer which is assumed to be constant and the reference "H1" designates the deflection of the washer in the condition of rest as measured along the axis X1-X2, along a generating-line of the washer between the two edges of this latter. The reference "K" designates the ratio: H1/E.

FIG. 16 is a graphical representation of the law which relates the variation of the deflection "H" of the conical washer 21 to the variation of the axial load "F". In the case of a washer of substantial thickness having a ratio "K" which is appreciably smaller than 1.4, a curve such as the curve 28.1 is accordingly obtained and represents a more or less linear deformation of the washer but with a point of inflexion in proximity to "zero"

deflection. In the case of a ratio "K" in the vicinity of 1.4, the curve flattens out and exhibits a point of inflexion having a horizontal tangent as represented by the curve 28.2.

When the washer 21 is of small thickness and has a ratio "K" which is appreciably larger than 1.4, the characteristic curve 28.3 of the washer exhibits three positions of interest as designated by the references B, L, C (shown in FIG. 16). AT "B", the washer is at rest under a zero load "F" with an initial deflection "H1" (position 21B of FIG. 15). At "L", the curve 28.3 exhibits a peak corresponding to a load "FL" or so-called ultimate load and to a small deflection "H2" of the washer which is almost completely flattened. A very slight increase in the load beyond the ultimate value "FL" gives rise to abrupt overstepping of the "zero" deflection position of the washer followed by a trough "L1" of the curve so as to pass without transition to a stable point "C" located on another branch of increasing load which is substantially parallel to the first branch B-L.

There corresponds substantially to the stable point "C" the ultimate load value "FL" which has already been mentioned but also a very different value of deflection "H3" of the washer, the conicity of which has abruptly reversed so as to assume the configuration shown diagrammatically at 21C in FIG. 15. By reducing the load "F" to a point below the ultimate value "FL" starting from the point "C" of the curve 28.3, there is again found a zone of elastic instability of the washer. This latter abruptly returns to the value of deflection H2 (point "L" of the curve), then progressively and elastically to its original deflection H1 (position 21B of FIG. 15) as a function of the reduction in load.

In FIG. 17 which is similar to the left-hand portion of FIGS. 11, 13 and 14, the three characteristic positions of the washer 21B, 21L, 21C are shown together diagrammatically. These three positions correspond to the properties explained earlier in connection with the curve 28.3 and applied to the valve in accordance with the invention. The washer which is not deformed in the throttling position 21B is shown in full lines. Design arrangements are made for ensuring that the active edge 13 of the non-deformed washer 21B is located directly opposite to the open portion of the grooves 25 of the annular projection 14. By virtue of said grooves, the flattening of the washer which passes from the position 21B to its ultimate or limit position 21L results in progressive reduction of the constricted passage which remains between the edge 13 and the projection 14.

In the ultimate position 21L of the flattened washer, the cross-sectional area of the grooves 25 is practically reduced to zero and the pressure of the fluid in the direction of the arrows 5B thus assists the washer 21 in rapidly passing through the instability zone. Said washer then moves very rapidly to the position of reversed conicity 21C so as to remain therein as long as the pressure of fluid corresponding at least to the ultimate value "FL" of the load applied to the washer is maintained. This progressive reduction of the constricted valve passage up to the ultimate position 21L of instability and complete leak-tightness ensures flexible and rapid operation of the valve without any shock effect while making it possible to obtain a high pressure of the controlled fluid. In the case of hydraulic shock-absorbers of suspension systems for which the invention is primarily intended, the above-mentioned properties of the valve ensure flexible and efficient operation of the shock-absorber by virtue of the speed of response of the valve and the high value of the resisting force which are obtained in the desired direction.

A reduction in pressure of the liquid which flows in the direction of the arrows 5B (as shown in FIG. 14) enables the washer 21 to revert to its normal conicity as a result of elasticity as soon as the pressure becomes lower than that of the ultimate load "FL". If the direction of flow of the liquid is reversed, for example according to the direction of the force applied to the piston-rod 3, the washer rapidly returns from the throttling position 21B to the free-flow position 21A (as shown in FIGS. 11 and 13) and compresses the auxiliary resilient washer 23. The valve is then ready to operate once again as has just been explained.

As has been mentioned earlier, the invention makes it possible to provide in a simple and economical form a valve which offers a high degree of endurance and very low resistance to the flow of the controlled fluid in one direction (shown in FIG. 13) but which offers on the other hand a high resistance to the flow of fluid in the other direction (as shown in FIGS. 11 and 14). By virtue of the abrupt and wide opening produced by the effect of reversal of conicity of the washer in accordance with the invention (shown in FIG. 14), the resistance aforesaid can exist over a wide range of flow rates of the controlled fluid. Furthermore, the flexibility and speed of response thus obtained are particularly advantageous in the case of closely spaced oscillations having a fairly short period which are encountered in the case of hydraulic suspension shock-absorbers for which the valve in accordance with the invention is primarily intended.

As can readily be understood, the invention is not limited to the embodiments which have just been described by way of example and many alternative forms can accordingly be contemplated without thereby departing either from the scope or the spirit of the invention.

Thus it follows as a consequence, especially in the case of hydraulic suspension shock-absorbers, that arrangements can be adopted for the valves which are the reverse of those shown in FIGS. 1, 6, 7, 8, 13, for example, whereby the free-flow position of the flexible washer 6A or 21A can be caused to correspond to the movement of expansion of the shock-absorber 2 (as shown in FIGS. 1 to 5) and not to the movement of compression of this latter. In fact, especially for reasons of overall size and convenience of assembly, it is possible to associate with the shock-absorber a reverse-motion mechanism comprising for example a lever having three axes of articulation for the purpose of reversing the direction of operation of the shock-absorber with respect to the case of direct assembly.

Similarly, it is possible to modify in many other ways the above-described combinations of a conical or flat resilient washer (whether provided with radial sectors or not) with throttling projections having various profiles (whether continuous or non-continuous) and associated with the peripheral edge 13 of the washer or with the central opening of this latter. A number of similar or different resilient washers can also be stacked one above the other in various ways in order to utilize the closure effect of at least one edge of one of these washers as explained in the foregoing.

There is shown in FIGS. 18 to 23 another advantageous alternative industrial form of construction of the valve in accordance with the invention which is preferably associated with a hydraulic suspension shock-absorber. The valve body is constituted by a cylindrical piston 31 of bronze or of light alloy, for example. An annular cavity 32 formed between a cylindrical wall 33 of the piston and an axial boss 34 has its opening on a first face 31A of the piston. The central opening of a conical resilient washer 21 which has already been described with reference to FIGS. 11 to 17 is fitted over the boss which is also cylindrical. The rod 3 on which is formed the boss 34 carries the stop 12 which defines the free-flow position of the washer and the annular cavity 32 has a substantially conical bottom wall 35 of smaller depth towards the axial boss 34 so as to constitute a throttling-position stop for the washer. In the non-deformed throttling position 21B, said washer has a conicity which is opposite to that of the bottom wall 35.

The cylindrical wall 33 of the piston is provided with openings in the form of a first series of castellations 37 which open on the first face 31A at the top of FIG. 20. The castellations 37 are uniformly spaced about the axis X1–X2 of the piston 31 and each have an extremity 38 which is located between the aforesaid face 31A of the piston and the bottom wall 35 of the annular cavity. Peripheral castellations 41 of a second series which are reversed with respect to the castellations 37 are interposed between these latter and have their openings on the other face 31B of the piston 31. At the end remote from the face 31B, each castellated recess 41 has an extremity which communicates through an opening 42 with the annular cavity 32 on the same side as the cylindrical wall 33. The opening 42 is at least partly displaced with respect to the bottom wall 35 at a height which is greater than the thickness of the washer 21 and smaller than the height of the extremities 38 of the castellations 37 of the first series.

As illustrated diagrammatically, there has been incorporated in FIG. 23 the above-mentioned arrangement of the extremity 38 of a castellated recess 37 with respect to the opening 42 of a castellated recess 41. The peripheral edge 13 of the washer 21 is adjusted with respect to the cylindrical wall 33 of the piston. Said edge is thus associated in the non-deformed throttling position 21B with an annular zone of the wall 33 which is located between the extremities 38 of the castellations 37 and the openings 42 of the castellations 41. The values of deflection at rest and of thickness of the conical washer 21 (FIGS. 15, 16) are chosen so as to ensure that the washer is capable of reacting at a predetermined value of the pressure of the controlled fluid as has been noted in connection with FIG. 17 in order to exhibit an elastic and temporary reversal of conicity (position 21C). As a result of this reversed conicity, the washer can be applied against the conical bottom wall 35 of the cavity 32 in order to free the openings 42 of the castellations of the second series and permit the flow of fluid under pressure.

It is pointed out that, in the case of the valve in accordance with the embodiments of FIGS. 18 to 23, the annular zone of the wall 33 which is located between the extremities 38 of the castellations 37 and the openings 42 of the castellations 41 can advantageously be provided with cuts which are similar to the cuts 25 of FIG. 13 and are of variable cross-section in the axial direction.

This form of construction of the valve in accordance with the invention permits in particular both simple and accurate machining of the piston 31, which is particularly advantageous for manufacture in large-scale production and dispenses with the need for a shaped annular projection such as the projection 14 of FIGS. 11 to 14.

There is shown in FIGS. 24 to 27 another family of valves in accordance with the invention in which the valve body constituted by a piston 51 comprises an outer cylindrical ring 52. Said ring is joined to an axial portion 53 mounted on the piston-rod 3 by means of radial partitions 54 between which are formed alveolate passages 55 for the fluid controlled by the valve.

In the embodiment shown in FIG. 24, the conical washer 21 described earlier cooperates by means of its central opening with an annular projection 56 located on the same side as the axial portion 53. The peripheral edge 13 of the washer is maintained by an annular shoulder of the outer ring 52, thus ensuring that the washer is centered in its various positions. In this embodiment, the piston-rod 3 carries a stop 11 which defines the free-flow position of the washer and is provided on its periphery with notches (as shown in FIG. 25) for the free flow of the fluid.

In the embodiment of FIG. 26, the washer 6 which has already been described and may be flat, for example, has a central opening which also cooperates with an axial annular projection 58 which can be provided with cuts of variable cross-section in the axial direction. The peripheral edge 13 of the washer in the throttling position 6B is applied flatwise and in a substantially leak-tight manner against an annular projection 57 of one face of the outer ring 52. The elastic deformation of the washer in the throttling position 6B permits, as already explained, a flow of the fluid under pressure between the edge of the central opening of the washer and the axial annular projection 58. In the free-flow position 6A on the stop 11 which is similar to that of FIG. 24, the peripheral edge 13 of the washer is held at a substantial distance from the annular projection 57 in order to facilitate the flow of the fluid at low pressure.

In the alternative embodiment of FIG. 27, the external ring 52 of the piston 51 which has just been described carries an internal annular projection 14. This projection 14 has already been mentioned as a throttling means associated with the peripheral edge 13 of the washer 21, the end positions of this latter being defined by the stops 11 and 12.

In FIG. 28 (which is similar to FIG. 23), there is shown diagrammatically an alternative embodiment of the valve in accordance with the invention and provided as already described with reference to FIGS. 18 to 23 with a conical washer 21 which is mounted within the annular cavity 32 of a castellated piston 31. The conical washer 21 is associated with an auxiliary piston 61 slidably mounted on the axial boss 34 between the washer 21 and the stop 12 which defines the free-flow position of the washer.

A peripheral edge 62 of the piston 61 is adjusted to the cylindrical wall 33 of the cavity 32 and cooperates in the throttling position with that annular zone of the wall 33 which is located between the castellations 37 and the openings 42 of the castellations 41. In the position of reverse conicity of the washer 21 which is compressed against the bottom of the cavity 32 by the piston 61 as this latter is subjected to the pressure of the liquid, the edge 62 of the auxiliary piston can thus free the openings 42. A valve of this type comprising an auxiliary piston 61 is advantageous, especially in the case of hydraulic shock-absorbers of large capacity.

We claim:

1. A variable-throttle valve comprising:

a valve body of revolution and a rod, the valve body being rigidly fixed to said rod, said rod extending along the revolution axis of said valve body, said body being provided with a peripheral wall surrounding said rod and defining a passageway for a fluid therebetween, said body and said fluid being movable relative to each other to generate a flow of fluid in a first direction or in a second direction through said passageway according to the direction of relative movement between said body and said fluid, said passageway being of revolution with respect to said axis of said valve body;

an annular zone providing a projection on said peripheral wall of said valve body, said projection being directed radially towards the axial rod;

a first stop and a second stop carried by said rod in said passageway; and a conical washer which is mounted generally transversely relative to said passageway and is pierced by a central opening through which said rod extends, said washer having a central edge capable of cooperating with each of said stops and a peripheral edge defining a variable cross-sectional area opening with said annular projection;

said stops being axially spaced apart a distance greater than the axial thickness of said washer;

said washer being capable of free displacement with respect to said body under the action of said flow of fluid through said passageway along said axis of said valve body between a free-flow end position in which said central edge of the washer engages said first stop when said flow of fluid is in said first direction and a throttling end position in which said central edge of the washer engages said second stop when said flow of fluid is in said second direction;

said washer being capable of elastic deformation, the deflection and the thickness in a condition of rest of said washer being in a ratio which is higher than 1.4, whereby temporary and elastic reversal of conicity of said washer is possible, said conical washer being oriented in such a manner that said washer is always in said condition of rest when said washer is in said free-flow position, whatever the fluid pressure at said passageway in said first direction of said flow or fluid, whereas when said washer is in said throttling end position, said washer is in said condition of rest when the fluid pressure at said passageway in said second direction of said flow of fluid is below a predetermined threshold value, the conicity of said washer being reversed when said fluid pressure at said passageway in said second direction of said flow of fluid is above said predetermined threshold value;

the variable cross-sectional area opening defined between said peripheral edge of said washer and said annular projection having a first value which permits the free flow of fluid through said passageway in said first direction when said washer is at said free-flow end position, said variable cross-sectional area opening having a second value achieved solely by radial clearance between said peripheral edge and said annular projection which constricts the flow of fluid through said passageway to a greatest degree when said washer is at said throttling end position and when said fluid pressure at said passageway in said second direction of said flow of fluid is below said predetermined threshold value, whereby said washer is in said condition of rest, and said variable cross-sectional area opening having a third value which constricts the flow of fluid through said passageway to a degree smaller than said greatest degree when said washer is at said throttling end position and when said fluid pressure at said passageway in said second direction of said flow of fluid is above said predetermined threshold value, whereby the conicity of said washer is reversed.

2. A valve according to claim 1, wherein said annular projection includes grooves of variable cross section extending parallel to said axis of said valve body.

3. A valve according to claim 2, wherein said cross section of said grooves increases in the direction of said washer displacement from said throttling end position toward said free-flow end position.

4. A valve according to claims 1 or 2 or 3, wherein said valve body is an element of a hydraulic shock absorber piston.

* * * * *

UNITED STATES PATENT AND TRADEMARK OFFICE
CERTIFICATE OF CORRECTION

PATENT NO. : 4,241,815

DATED : December 30, 1980

INVENTOR(S) : Jean Federspiel

It is certified that error appears in the above—identified patent and that said Letters Patent is hereby corrected as shown below:

Page 1, column 1, after "Assignee: Commissariat a l'Energie Atomique" add --and Jean Federspiel--.

Signed and Sealed this

Twentieth Day of October 1981

[SEAL]

Attest:

Attesting Officer

GERALD J. MOSSINGHOFF

Commissioner of Patents and Trademarks